US012423099B2

(12) United States Patent
Brunie

(10) Patent No.: US 12,423,099 B2
(45) Date of Patent: Sep. 23, 2025

(54) STATEFUL VECTOR GROUP PERMUTATION WITH STORAGE REUSE

(71) Applicant: SiFive, Inc., San Mateo, CA (US)

(72) Inventor: Nicolas Rémi Brunie, San Mateo, CA (US)

(73) Assignee: SiFive, Inc., Santa Clara, CA (US)

( * ) Notice: Subject to any disclaimer, the term of this patent is extended or adjusted under 35 U.S.C. 154(b) by 102 days.

(21) Appl. No.: 18/524,149

(22) Filed: Nov. 30, 2023

(65) Prior Publication Data

US 2024/0184574 A1   Jun. 6, 2024

Related U.S. Application Data

(60) Provisional application No. 63/429,952, filed on Dec. 2, 2022.

(51) Int. Cl.
*G06F 9/30* (2018.01)

(52) U.S. Cl.
CPC ...... *G06F 9/30036* (2013.01); *G06F 9/30038* (2023.08); *G06F 9/3012* (2013.01)

(58) Field of Classification Search
CPC ............. G06F 9/30036; G06F 9/30038; G06F 9/3012; G06F 9/30018; G06F 9/30032
See application file for complete search history.

(56) References Cited

U.S. PATENT DOCUMENTS

| | | | | |
|---|---|---|---|---|
| 2012/0060015 A1* | 3/2012 | Eichenberger | ...... | G06F 9/30032 712/E9.027 |
| 2012/0151156 A1* | 6/2012 | Citron | ................. | G06F 12/0862 711/E12.001 |
| 2014/0344553 A1* | 11/2014 | Hughes | ............... | G06F 9/30043 712/208 |
| 2015/0347475 A1* | 12/2015 | Kimura | ............... | G06F 9/30036 707/752 |
| 2017/0177345 A1* | 6/2017 | Ould-Ahmed-Vall | ...................... | G06F 9/30029 |
| 2021/0405969 A1* | 12/2021 | Nagasaka | ........... | G06F 9/30036 |

* cited by examiner

*Primary Examiner* — Shawn Doman
(74) *Attorney, Agent, or Firm* — Kilpatrick Townsend & Stockton LLP

(57) ABSTRACT

Systems and methods are disclosed for stateful vector group permutation with storage reuse. For example, some methods may include expanding an element index from a vector of indices to obtain byte indices for respective bytes of a corresponding element; storing the byte indices in corresponding bytes of an intermediate result operand buffer; updating bits in a completion flags buffer to indicate that the corresponding bytes of the intermediate result operand buffer store indices; identifying bytes of an element of the vector of source data pointed to by the element index based on the byte indices stored in the intermediate result operand buffer; overwriting the byte indices in the intermediate result operand buffer with the identified bytes; and, responsive to overwriting the byte indices, updating the corresponding bits in the completion flags buffer to indicate that the corresponding bytes store data to be written to the destination vector.

20 Claims, 11 Drawing Sheets

STATEFUL VECTOR GROUP PERMUTATION WITH STORAGE REUSE

CROSS-REFERENCE TO RELATED APPLICATION(S)

This application claims priority to and the benefit of U.S. Provisional Patent Application Ser. No. 63/429,952, filed Dec. 2, 2022, the entire disclosure of which is hereby incorporated by reference.

TECHNICAL FIELD

This disclosure relates to stateful vector group permutation with storage reuse.

BACKGROUND

Processors may be configured to execute vector register gather instructions that read elements from a first source vector register group at locations given by a second source vector register group. The index values in the second vector may be treated as unsigned integers. The source can be read at any index less than a maximum vector length. For example, the RISC-V instruction set architecture's vector extension includes a vector gather instruction with the following syntax:
vrgather.vv vd, vs2, vs1, vm #vd[i]=(vs1[i]>=VLMAX) ?0: vs2[vs1[i]];
where vm is a mask register.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Disclosed herein are implementations of stateful vector group permutation with storage reuse. Some implementations may be used to perform vector permutation instructions (e.g., vector gather instructions) in a processor (e.g., CPUs such as x86, ARM, and/or RISC-V CPUs) more efficiently than previously known solutions.

Figure 9:
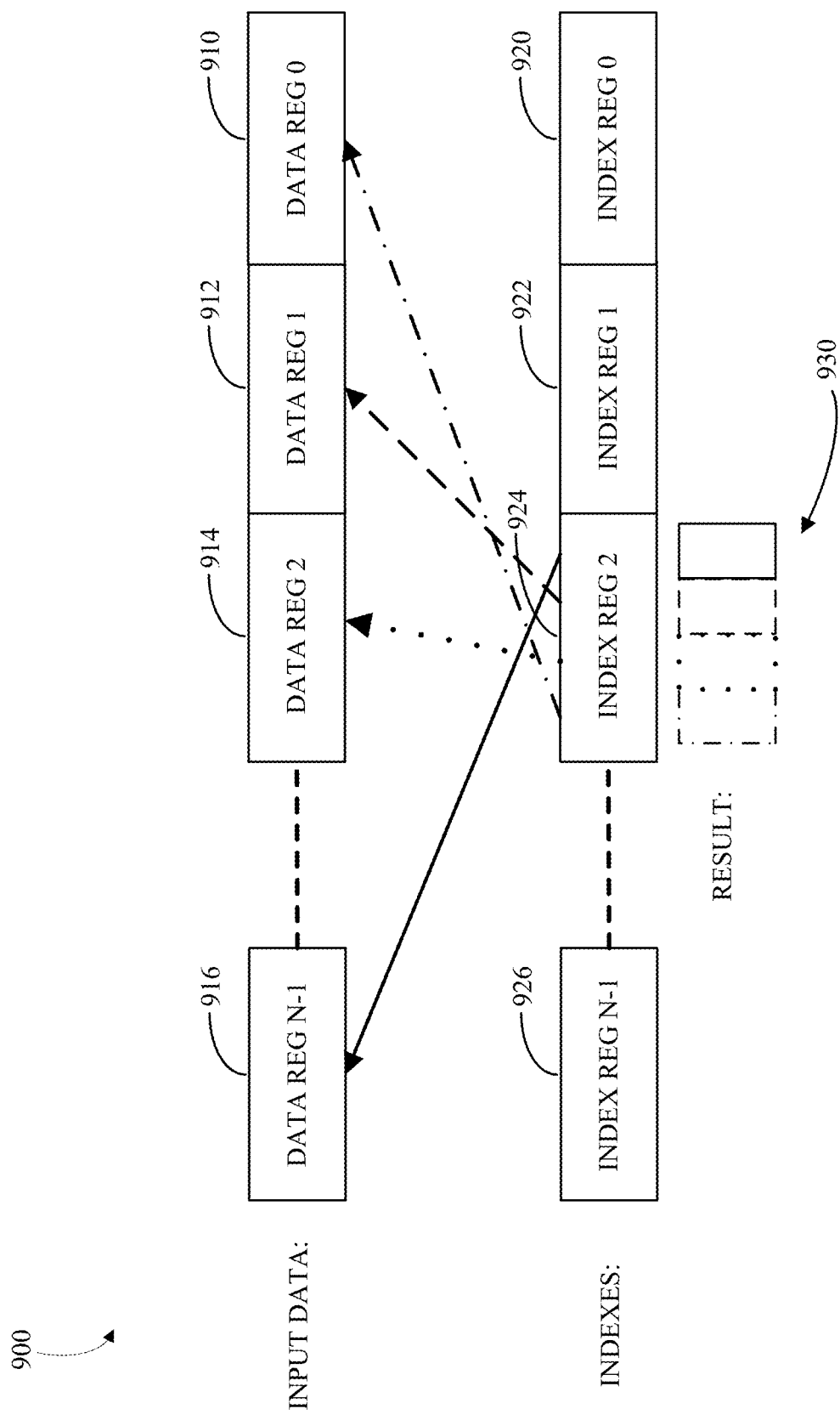
FIG. 9 is an illustration of an example of a vector gather operation.

For example, large vector permutations may be implemented using out-of-order vector processors. A large vector permutation is a permute operation where an index vector group (set of multiple vector registers) containing an array of index values is used to index a data vector group to build a destination vector group, where each destination element corresponds to the data element at the position indicated by an index in the index vector group. The operation can optionally be masked, where an extra mask operand indicates which elements in the destination vector group are replaced by indexed data and which should be left undisturbed or overwritten by a random value. An example of a vector permutation operation in the RISC-V Vector extension (RVV) version 1.0 are the vrgather(ei16). vv instructions with LMUL>1, where LMUL refers to the size of a vector register group, i.e., the number of registers in the group. An example of a vector permutation operation is illustrated in FIG. 9.

The pipeline of an out-of-order vector processor presents a few challenges when implementing large vector permutation operations. One of those challenges is that this pipeline may be built as a linear sequence of stages, in particular the core middle end is constituted by the following stages executed in the following order. First, a sequencer, which generates micro-ops to execute each vector instruction. Second, a rename stage, which transforms the architectural register indices in the micro-ops into physical register indices, thus mapping architectural to physical resources, for example, to remove write-after-write (WaW) dependencies. Third, a dispatch stage, which steers the renamed micro-ops into an issue queue, where micro-ops wait for their dependencies to be ready and for an execution slot. Fourth, issue and execute stages where ready micro-ops are picked, issued, then read their operands (from register files or bypass), and finally perform their operation and write back their result. The data for a micro-op are not known before the operand-read stage. In particular the data for a micro-op are not known during sequencing, rename, and dispatch. For a vector permutation, in particular, this means that the index values are not known while the micro-ops are sequenced, renamed, dispatched, and issued and so the micro-op sequence should accommodate for arbitrary index values.

The simplest way to implement such large permutation is stateless: for each destination register the sequencer generates as many micro-ops as there are registers in the data set, each micro-op reads the previous value of the destination register, reads the index register corresponding to the targeted destination register and one data register and merge the new destination values, corresponding to the entry in the index register contained in the data register, with the destination register. This method exhibits a quadratic complexity in the number of registers in the group (e.g., LMUL*LMUL micro-ops), emitting LMUL micro-ops for each destination register. It ensures that the full source register group is scanned. This assumes that an elementary operation performs a register-to-register permutation. This complexity can be reduced if multiple data registers are read by each micro-op and even further reduced if multiple index registers are read. This method may have multiple drawbacks, such as, the number of micro-ops sequenced always corresponds to the worst case, and the number of micro-ops can be very large for large input register groups, which monopolizes processor pipeline resources, such as, the sequencer, renamer, and slots in the dispatch buffer and the issue queues.

Another, more efficient (in terms of micro-ops and occupancy) way to implement a generic permutation operation (e.g., the vrgather instruction of the RISC-V Vector (RVV) instruction set architecture) on a large register group in an out-of-order processor utilizes manipulation of the full input dataset, an index set and a whole intermediate result state: all of those are loaded and stored in a stateful execution unit which performs the full vector group permute. For this method, we distinguish two steps (which can overlap): a loading step and an execution step. During the loading step a multiple of LMUL micro-ops are used to move data+index+old-destination-data+mask from physical register to the execution unit storage. During the execution steps, the permutation is performed by reading data and intermediary result from the local storage and forward final results for write back when they are ready. The execution sequencing may be optimized to only execute local data register read when a destination index requires it, saving precious operations if not all accesses are required. The local storage required by this method is expensive, assuming each vector register in the group is VLEN-bit wide, and the group contains N registers, it requires 3*N*VLEN bits of storage capacity (plus extra storage for the masks).

Figure 10:
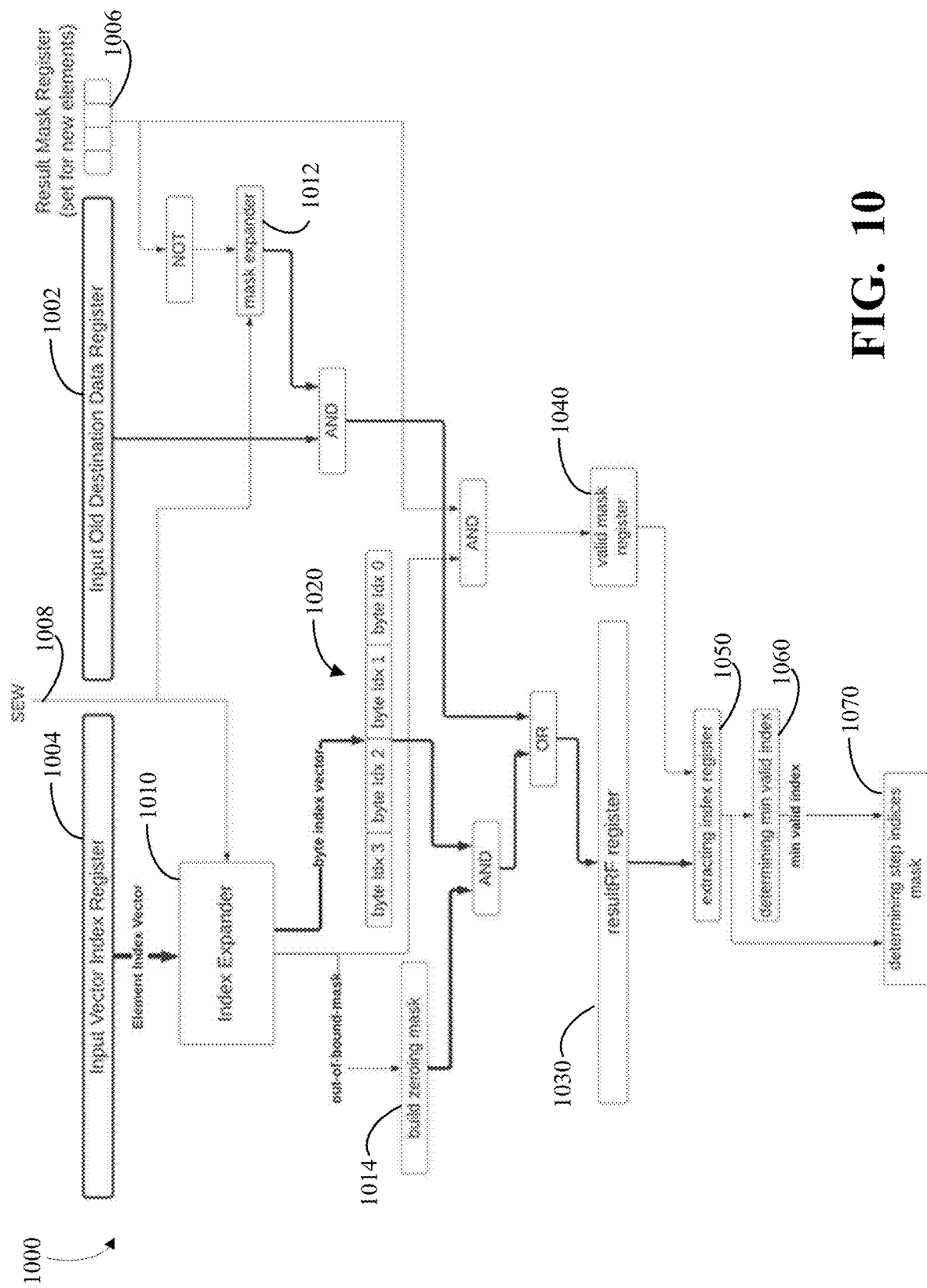
FIG. 10 is a block diagram of an example of a system for executing instructions including stateful vector group permutation with storage reuse.
Figure 11:
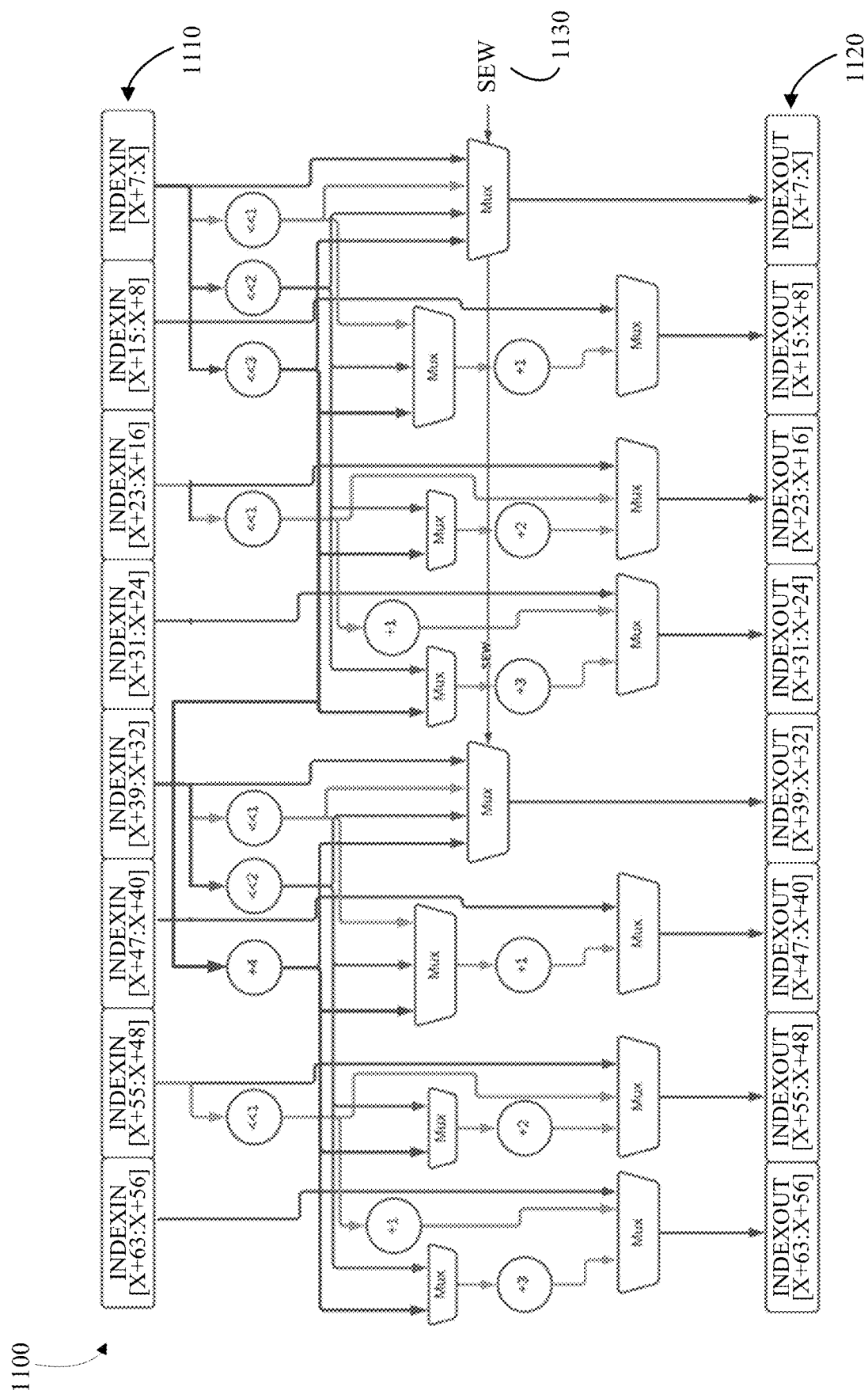
FIG. 11 is a block diagram of an example of a system for index expansion from element indices to byte indices.

Some implementations described herein utilize a mechanism where intermediary results and expanded indexes are stored in the same register (sharing register capacity), thus reducing by one third the amount of intermediary storage required, down to 2*N*VLEN bits. The solution relies on the following mechanism. First, storage initialization is performed by reading a result register (with a result mask) and an index register simultaneously, pair by pair from the input register groups. A first module, called an index expander, expands the element indexes into byte indexes (i.e., there is one byte index per byte of the result and each is indexing a byte in the input data group). The index expander expects two inputs: a datapath width (DLEN) input index vector and a standard element width (SEW) value. Based on SEW, it expands the vector of element indexes into (DLEN/8) byte indices. For example, FIG. 11 shows an example of index expander architecture (for a 64-bit slice). Some hardware is reused between various SEW to reduce area. From the result mask an index validity mask is built, which indicates which bytes in the common storage are indexes and, at the same time, which bytes are result bytes. Based on the result mask an initial result value is built, where only the original data bytes expected to appear in the result are kept (e.g., all others are zeroed off). Based on the result mask an initial index value is built, where only the expanded byte indexes corresponding to elements not expected to come from the original data bytes are kept (e.g., all others are zeroed off). The initial index value and the initial result value are bitwise OR-ed together and the result is stored in the common storage alongside the byte index validity mask. For example, FIG. 10 shows an architecture for storage initialization. Second, result building is performed by, during each iteration, to populate the result, a valid byte index is retrieved and used to select a data register to read from the data state. Each byte index which can be found in the data read is extracted and added into the intermediate result replacing the byte index. The corresponding bit of the index validity mask is disabled. Once the index validity mask is all zeros, the corresponding result is ready to be forwarded.

As index and result elements can have different width (e.g., RISC-V Vectors' vrgatherei16 instruction with SEW !=16-bit) some implementations may read more index bits than result bits (or less) to be able to initialize a shared result/index register properly.

Extension to register groups larger than 256 elements: Some implementations, described above, would be limited to 8-bit byte indexing as the byte index must fit into the byte result size. This means that the input data register group cannot contain more than 256 elements. This limitation can be removed by extending the byte index register by log 2(number of input elements)−8 bits for each index. This solution is cost effective until the full byte index reaches 16-bit wide (65536 elements). In such case, the total storage is back to the initial level where the full index state was stored separately. This value corresponds to the maximum number of elements allowed in the RISC-V Vector 1.0 specification.

Some implementations may provide advantages over conventional systems for vector permutation, such as, for example, increasing execution speed, reducing integrated circuit area, and/or reducing power consumption.

As used herein, the term "circuitry" refers to an arrangement of electronic components (e.g., transistors, resistors, capacitors, and/or inductors) that is structured to implement one or more functions. For example, a circuitry may include one or more transistors interconnected to form logic gates that collectively implement a logical function.

Figure 1:
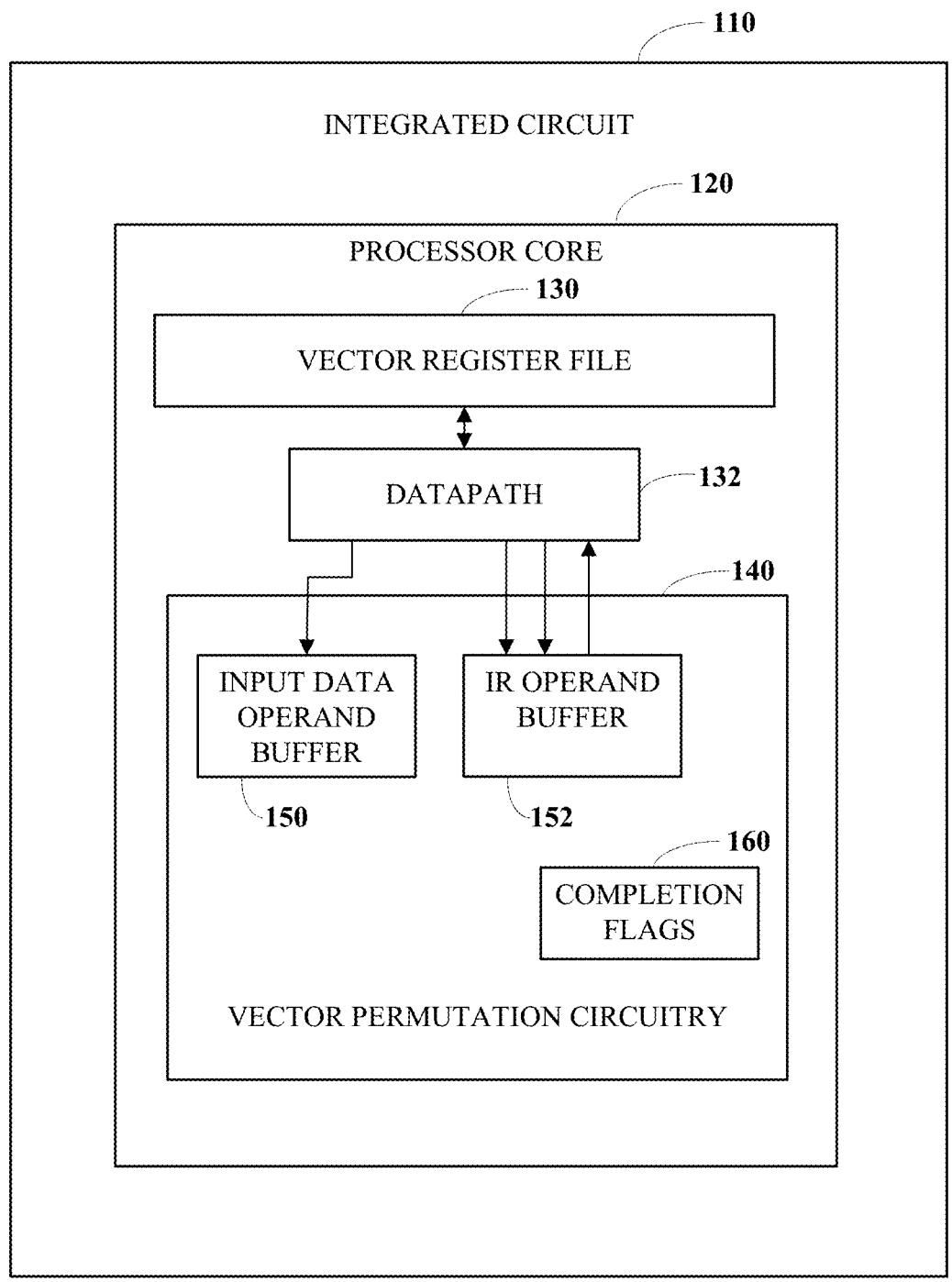
FIG. 1 is a block diagram of an example of an integrated circuit for executing instructions including stateful vector group permutation with storage reuse.

FIG. 1 is a block diagram of an example of an integrated circuit 110 for executing instructions including stateful vector group permutation with storage reuse. For example, the integrated circuit 110 may be a processor, a microprocessor, a microcontroller, or an IP core. The integrated circuit 110 includes a processor core 120 configured to execute vector instructions that operate on vector arguments. The processor core 120 includes a vector register file 130 connected via a datapath 132 to one or more execution units, including a vector permutation circuitry 140 configured to, responsive to a vector permutation instruction, copy data from a vector of source data stored in the vector register file 130 to a destination vector to be stored in the vector register file 130 based on a vector of indices stored in the vector register file 130. The vector permutation circuitry 140 includes an input data operand buffer 150 for temporarily storing source data from at least one register of the vector register file 130; an intermediate result operand buffer 152 for temporarily storing index data from at least one register of the vector register file 130; and completion flags buffer 160 storing flags indicating which portions of a result vector have been determined and are ready for storage in the vector register file 130. For example, the integrated circuit 110 may be used to implement the technique 200 of FIG. 2. For example, the integrated circuit 110 may be used to implement the techniques 300, 400, 500, and/or 600 of FIGS. 3-6.

The integrated circuit 110 includes a vector register file 130 configured to store register values of an instruction set architecture. In some implementations, the processor core 120 supports temporal processing of large vectors and the vector register file 130 supports register grouping to support vectors of varying lengths. For example, the processor core 120 may implement the RISC-V with vector extension and the vector register file 130 may be configured to store the register values of the RISC-V vector extension.

The integrated circuit 110 includes a datapath 132 with one or more ports of width b bits (e.g., 128 bits, 256 bits or 512 bits) connecting the vector register file 130 to one or more execution units of the processor core 120. In some implementations, the width b of the ports may limit the speed at which data from large vectors may be processed to complete execution of a vector instruction.

The integrated circuit 110 includes an input data operand buffer 150. The input data operand buffer 150 may be connected to the vector register file 130 via the datapath 132. The input data operand buffer 150 may be configured to store input data of a vector permutation instruction (e.g., a vector gather instruction) that are read from a source register in the vector register file 130.

The integrated circuit 110 includes an intermediate result operand buffer 152. The intermediate result operand buffer 152 may be connected to the vector register file 130 via the datapath 132. The intermediate result operand buffer 152 may be configured to store indices of a vector permutation instruction (e.g., a vector gather instruction) that are read from a source register in the vector register file 130. The intermediate result operand buffer 152 may also be configured to store output data of the vector permutation instruction that will be written to a destination register in the vector register file 130. As indices are dereferenced, they may be overwritten in the intermediate result operand buffer 152 with their corresponding element of output data that has been selected from the input data operand buffer 150.

The integrated circuit 110 includes a completion flags buffer 160. The completion flags buffer 160 may store flags (e.g., bits) corresponding to respective indices stored in the intermediate result operand buffer 152 indicating whether its respective index has been processed as needed. For example, completion of all the indices in the intermediate result operand buffer 152, as reflected in the completion flags buffer 160, may trigger output of data in the intermediate result operand buffer 152 to a destination register in the vector register file 130 and/or reading of a next set indices of length b bits from the vector register file 130 to the intermediate result operand buffer 152.

The integrated circuit 110 includes a vector permutation circuitry 140 configured to execute a vector permutation instruction identifying a vector of indices stored in the vector register file 130, a vector of source data stored in the vector register file 130, and a destination vector to be stored in the vector register file 130. In some implementations, the vector of source data, the vector of indices, and the destination vector are each stored in respective groups of multiple registers in the vector register file 130. The vector permutation circuitry 140 may be configured to, responsive to the vector permutation instruction, read the vector of source data into the input data operand buffer 150; expand an element index from the vector of indices to obtain byte indices for respective bytes of a corresponding element; store the byte indices in corresponding bytes of the intermediate result operand buffer 152; update bits in the completion flags buffer 160 corresponding to the bytes of the intermediate result operand buffer 152 storing the byte indices to indicate that the corresponding bytes store indices; identify bytes of the input data operand buffer 150 storing an element of the vector of source data pointed to by the element index based on the byte indices stored in the intermediate result operand buffer 152; overwrite the byte indices in the intermediate result operand buffer 152 with the identified bytes from the input data operand buffer 150; and, responsive to overwriting the byte indices in the intermediate result operand buffer 152 with the identified bytes from the input data operand buffer 150, update the corresponding bits in the completion flags buffer 160 to indicate that the corresponding bytes store data to be written to the destination vector. In some implementations, the vector permutation circuitry 140 is configured to check whether a second element index from the vector of indices is outside of a valid range for vector indices; and, responsive to the second element index being outside of the valid range, update flags in the completion flags buffer 160 corresponding to the second element index to indicate that handling of bytes in the intermediate result operand buffer 152 corresponding the second element index has completed. For example, the vector permutation circuitry 140 may be configured to, responsive to the second element index being outside of the valid range, update an element in the intermediate result operand buffer 152 corresponding to the second element index to take a default value associated with an index overflow condition. In some implementations, the vector permutation circuitry 140 is configured to, responsive to the completion flags buffer 160 indicating that a portion of the intermediate result operand buffer 152 corresponding to a complete register stores data to be written to the destination vector, write data from the portion of the intermediate result operand buffer 152 to a register in the vector register file 130. For example, the vector permutation circuitry 140 may include a byte resolution data crossbar.

In some implementations, the vector permutation instruction may include a mask argument. For example, the vector permutation circuitry 140 may be configured to read a register of the vector of source data, a register of the vector of indices, and a register of the destination vector in parallel from the vector register file 130; and selectively store, based on a mask argument for the destination vector, bytes read from the destination vector and byte indices determined by expanding element indices of the vector of indices to a portion of the intermediate result operand buffer 152 with a length equal to a register in the vector register file 130. In some implementations, the vector permutation circuitry 140 may be configured to determine, based on a mask argument for the destination vector, an initial result array including bytes read from the destination vector corresponding to masked-off elements of the destination vector and zeroed bytes corresponding to elements expected to come from the source data vector; determine, based on the mask argument for the destination vector, an initial byte index array including expanded byte indexes corresponding to elements expected to come from the source data vector and zeroed bytes corresponding to masked-off elements; and store a bitwise OR of the initial result array and the initial byte index array in the intermediate result operand buffer 152. For example, the vector permutation circuitry 140 may include the system 1000 of FIG. 10. In some implementations, the vector permutation circuitry 140 may be configured to update, based on the mask argument for the destination vector, bits in the completion flags buffer 160 corresponding to the bytes of the intermediate result operand buffer 152 corresponding to masked-off elements to indicate that the corresponding bytes store data to be written to the destination vector; and update, based on the mask argument for the destination vector, bits in the completion flags buffer 160 corresponding to the bytes of the intermediate result operand buffer 152 corresponding to elements expected to come from the source data vector to indicate that the corresponding bytes store indices.

Figure 2:
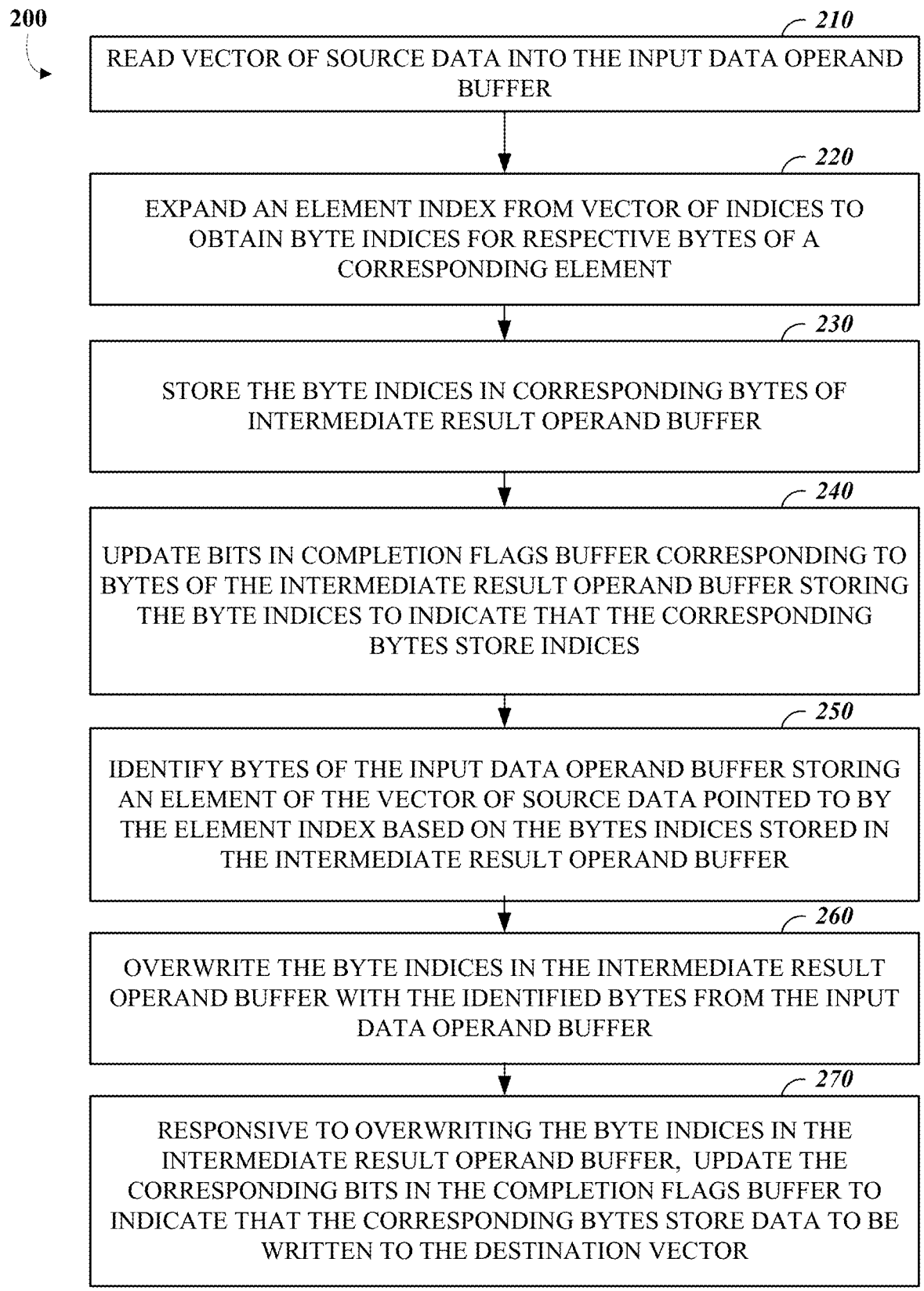
FIG. 2 is a flow chart of an example of a technique for stateful vector group permutation with storage reuse.

FIG. 2 is a flow chart of an example of a technique 200 for stateful vector group permutation with storage reuse. The technique 200 may be used for executing a vector permutation instruction (e.g., a vector gather instruction) identifying a vector of indices stored in a vector register file (e.g., the vector register file 130), a vector of source data stored in the vector register file, and a destination vector to be stored in the vector register file. The technique 200 includes reading 210 data from the vector of source data into an input data operand buffer; expanding 220 an element index from the vector of indices to obtain byte indices for respective bytes of a corresponding element; storing 230 the byte indices in corresponding bytes of an intermediate result operand buffer; updating 240 bits in a completion flags buffer corresponding to the bytes of the intermediate result operand buffer storing the byte indices to indicate that the corresponding bytes store indices; identifying 250 bytes of an element of the vector of source data pointed to by the element index based on the byte indices stored in the intermediate result operand buffer; overwriting 260 the byte indices in the intermediate result operand buffer with the identified bytes; and, responsive to overwriting 260 the byte indices in the intermediate result operand buffer with the identified bytes, updating 270 the corresponding bits in the completion flags buffer to indicate that the corresponding bytes store data to be written to the destination vector. For example, the technique 200 may be implemented using the integrated circuit 110 of FIG. 1.

The technique 200 includes reading 210 data from the vector of source data into an input data operand buffer (e.g., the input data operand buffer 150). In some implementations, the vector of source data, the vector of indices, and the destination vector are each stored in respective groups of multiple registers in a vector register file (e.g., the vector register file 130). For example, the input data operand buffer may be connected to the vector register file via a datapath (e.g., the datapath 132). In some implementations, the vector of source data is read 210 one register at a time into the input data operand buffer.

The technique 200 includes expanding 220 an element index from the vector of indices to obtain byte indices for respective bytes of a corresponding element. For example, a vector with 64 elements of size or width equal to four bytes (e.g., SEW=32 bits), an index for one of the elements is expanded 220 into four byte indices. Where the original index for the element has value j, the four resulting byte indices will have values j*4, j*4+1, j*4+2, and j*4+3. For example, the system 1100 of FIG. 11 may be used to expand 220 the element indices from the vector of indices to obtain byte indices.

The technique 200 includes storing 230 the byte indices in corresponding bytes of an intermediate result operand buffer (e.g., the intermediate result operand buffer 152). For example, a vector with elements of size or width equal to four bytes, four consecutive bytes in the intermediate result operand buffer corresponding to an element of the destination vector may be initialized with the byte index values j*4, j*4+1, j*4+2, and j*4+3, where j was the value of the element index for the element. In some implementations, a mask argument for the vector permutation instruction is used to restrict storing 230 of indices in the intermediate result operand buffer. For example, where a mask argument indicates that an element of the destination vector should not be updated, a portion of the intermediate result operand buffer corresponding to the masked element may be written with a current value stored by the destination vector in the physical register file in lieu of a corresponding set of byte indices for that masked element. In some implementations, the technique 300 of FIG. 3 may be used to selectively store 230 the byte indices in corresponding bytes of an intermediate result operand buffer when using a mask. In some implementations, the technique 400 of FIG. 4 may be used to selectively store 230 the byte indices in corresponding bytes of an intermediate result operand buffer when using a mask. In some implementations, the technique 600 of FIG. 6 may be used to check that element indices are in valid range when initializing the intermediate result operand buffer and filling in corresponding bytes of the intermediate result operand buffer with a default or reserved value when the corresponding element index is invalid. For example, the system 1000 of FIG. 10 may be used to store 230 byte indices in corresponding bytes of an intermediate result operand buffer during an initialization phase of execution of a vector permutation instruction.

The technique 200 includes updating 240 bits in a completion flags buffer (e.g., the completion flags buffer 160) corresponding to the bytes of the intermediate result operand buffer storing the byte indices to indicate that the corresponding bytes store indices. As long as valid indices remain in the intermediate result operand buffer, it will be held to await dereferencing of those indices to replace them with data from the source vector stored in the input data operand buffer. When no valid indices remain in the intermediate result operand buffer, the values stored in the intermediate result operand buffer may be output to one or more registers in a physical register file that will store the destination vector. In some implementations, the technique 500 of FIG. 5 may be used to update 240 bits in a completion flags buffer when using a mask.

The technique 200 includes identifying 250 bytes of an element of the vector of source data pointed to by the element index based on the byte indices stored in the intermediate result operand buffer.

The technique 200 includes overwriting 260 the byte indices in the intermediate result operand buffer with the identified bytes. By overwriting 260 the byte indices with the destination vector data for output, the storage of the intermediate result operand buffer is reused to conserve area and/or power consumption in an integrated circuit implementing the technique 200. In some implementations, overwriting 260 the byte indices in the intermediate result operand buffer with the identified bytes is implemented using byte resolution crossbar.

The technique 200 includes, responsive to overwriting 260 the byte indices in the intermediate result operand buffer with the identified bytes, updating 270 the corresponding bits in the completion flags buffer to indicate that the corresponding bytes store data to be written to the destination vector. Once none of the bytes in the intermediate result operand buffer store, or a section of the intermediate result operand buffer store corresponding to a register of data in destination vector to be written via a datapath to a register in a physical register file, the bytes of data in the intermediate result operand buffer (or register size section of the intermediate result operand buffer) can be written back to one or more destination registers in the physical register file. For example, the technique 200 may include, responsive to the completion flags buffer indicating that a portion of the intermediate result operand buffer corresponding to a complete register stores data to be written to the destination vector, writing data from the portion of the intermediate result operand buffer to a register in the vector register file.

Figure 3:
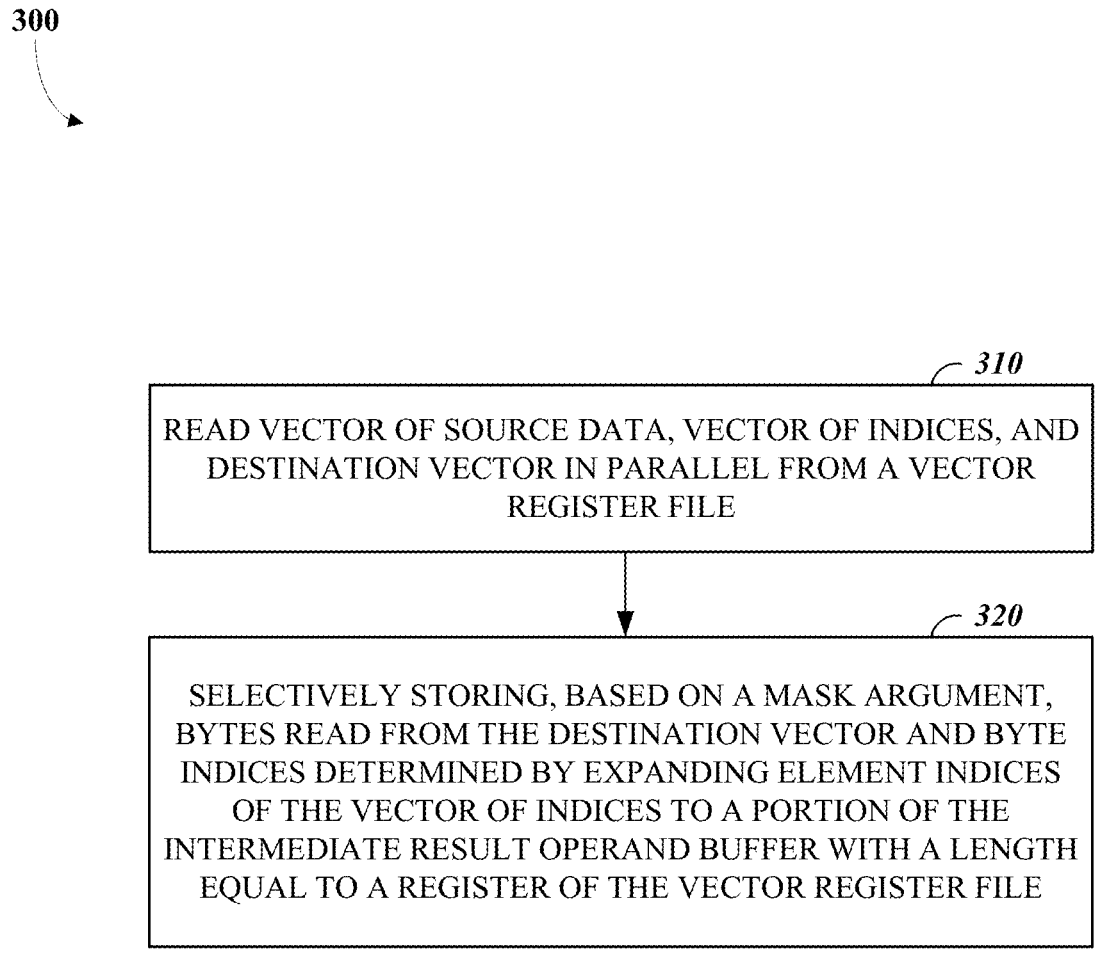
FIG. 3 is a flow chart of an example of a technique for reading data from a vector register file and selectively storing, based on a mask argument, a combination of old destination vector data and byte indices in an intermediate result operand buffer.

FIG. 3 is a flow chart of an example of a technique 300 for reading data from a vector register file and selectively storing, based on a mask argument, a combination of old destination vector data and byte indices in an intermediate result operand buffer (e.g., the intermediate result operand buffer 152). The technique 300 includes reading 310 a register of the vector of source data, a register of the vector of indices, and a register of the destination vector in parallel from a vector register file. For example, the data may be read 310 from the vector register file 130 via the datapath 132. The technique 300 includes selectively storing 320, based on a mask argument for the destination vector, bytes read from the destination vector, and byte indices determined by expanding element indices of the vector of indices to a portion of the intermediate result operand buffer with a length equal to a register in the vector register file. For example, the technique 300 may be implemented using the integrated circuit 110 of FIG. 1. For example, the technique 300 may be implemented using the system 1000 of FIG. 10.

Figure 4:
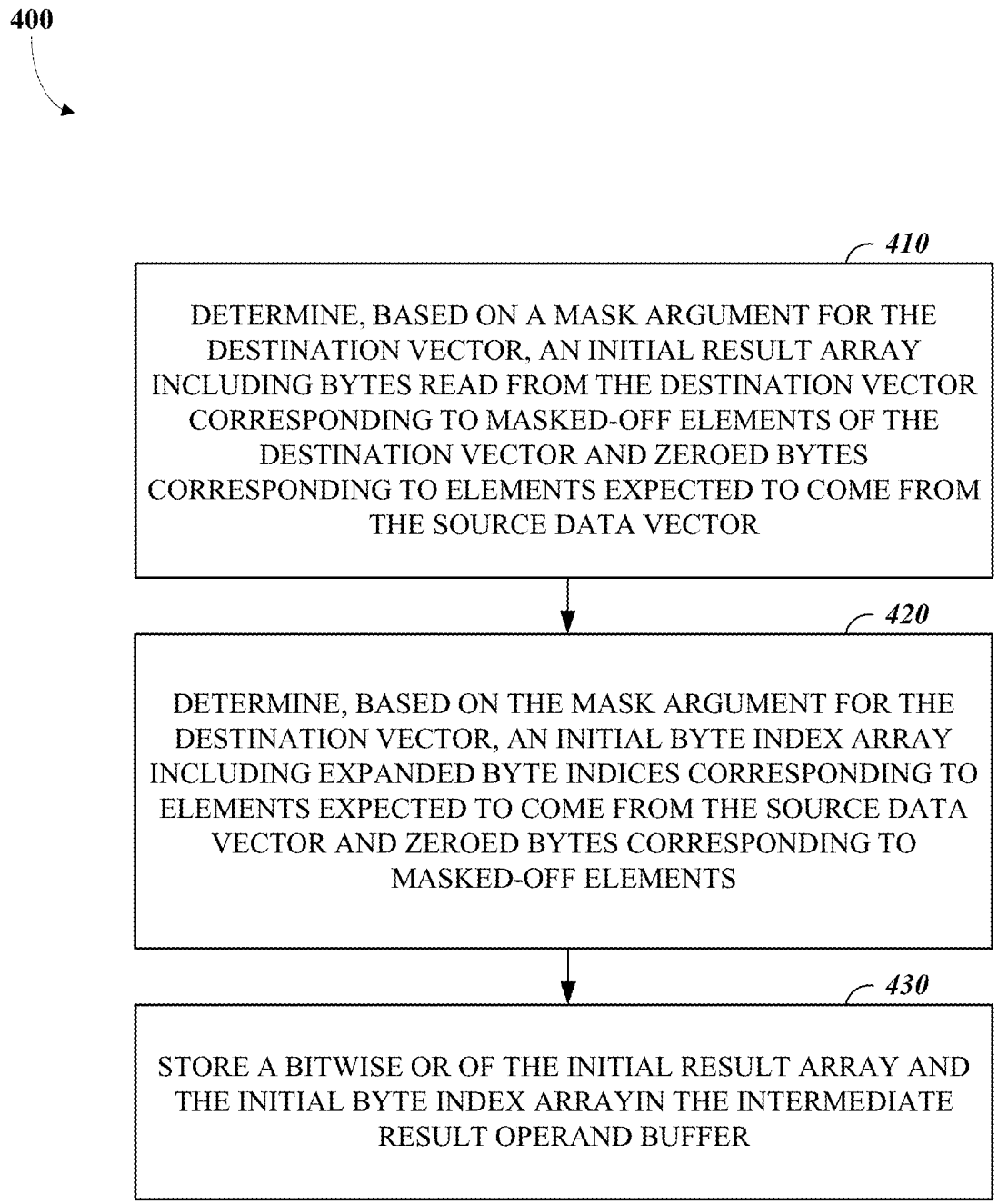
FIG. 4 is a flow chart of an example of a technique for selectively storing, based on a mask argument, a combination of old destination vector data and byte indices in an intermediate result operand buffer.

FIG. 4 is a flow chart of an example of a technique 400 for selectively storing, based on a mask argument, a combination of old destination vector data and byte indices in an intermediate result operand buffer (e.g., the intermediate result operand buffer 152). The technique 400 includes determining 410, based on a mask argument for the destination vector, an initial result array including bytes read from the destination vector corresponding to masked-off elements of the destination vector and zeroed bytes corresponding to elements expected to come from the source data vector; determining 420, based on the mask argument for the destination vector, an initial byte index array including expanded byte indices corresponding to elements expected to come from the source data vector and zeroed bytes corresponding to masked-off elements; and storing 430 a bitwise OR of the initial result array and the initial byte index array in the intermediate result operand buffer. For example, the technique 400 may be implemented using the integrated circuit 110 of FIG. 1. For example, the technique 400 may be implemented using the system 1000 of FIG. 10.

Figure 5:
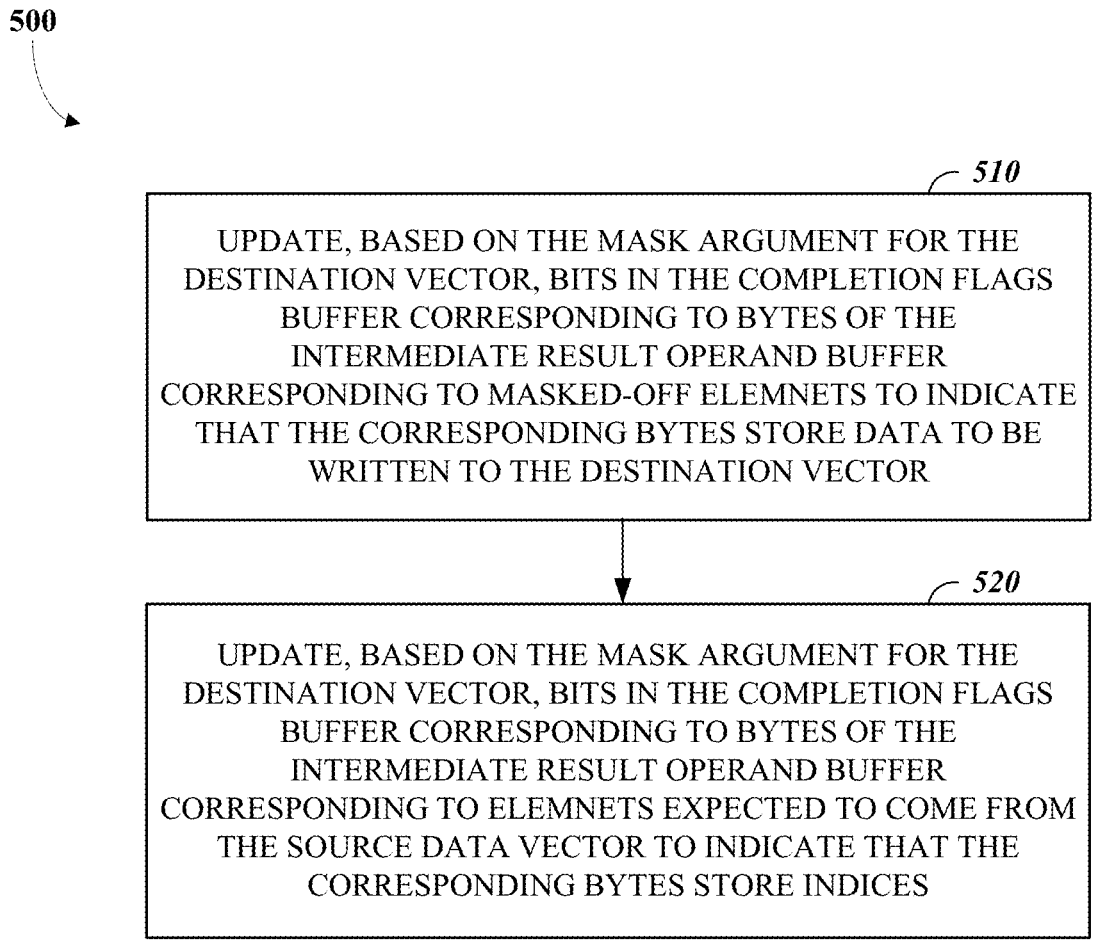
FIG. 5 is a flow chart of an example of a technique for initializing a completion flags buffer based on a mask argument.

FIG. 5 is a flow chart of an example of a technique 500 for initializing a completion flags buffer (e.g., the completion flags buffer 160) based on a mask argument. The technique 500 includes updating 510, based on the mask argument for the destination vector, bits in the completion flags buffer corresponding to the bytes of the intermediate result operand buffer corresponding to masked-off elements to indicate that the corresponding bytes store data to be written to the destination vector; and updating 520, based on the mask argument for the destination vector, bits in the completion flags buffer corresponding to the bytes of the intermediate result operand buffer corresponding to elements expected to come from the source data vector to indicate that the corresponding bytes store indices. For example, the technique 500 may be implemented using the integrated circuit 110 of FIG. 1. For example, the technique 500 may be implemented using the system 1000 of FIG. 10.

Figure 6:
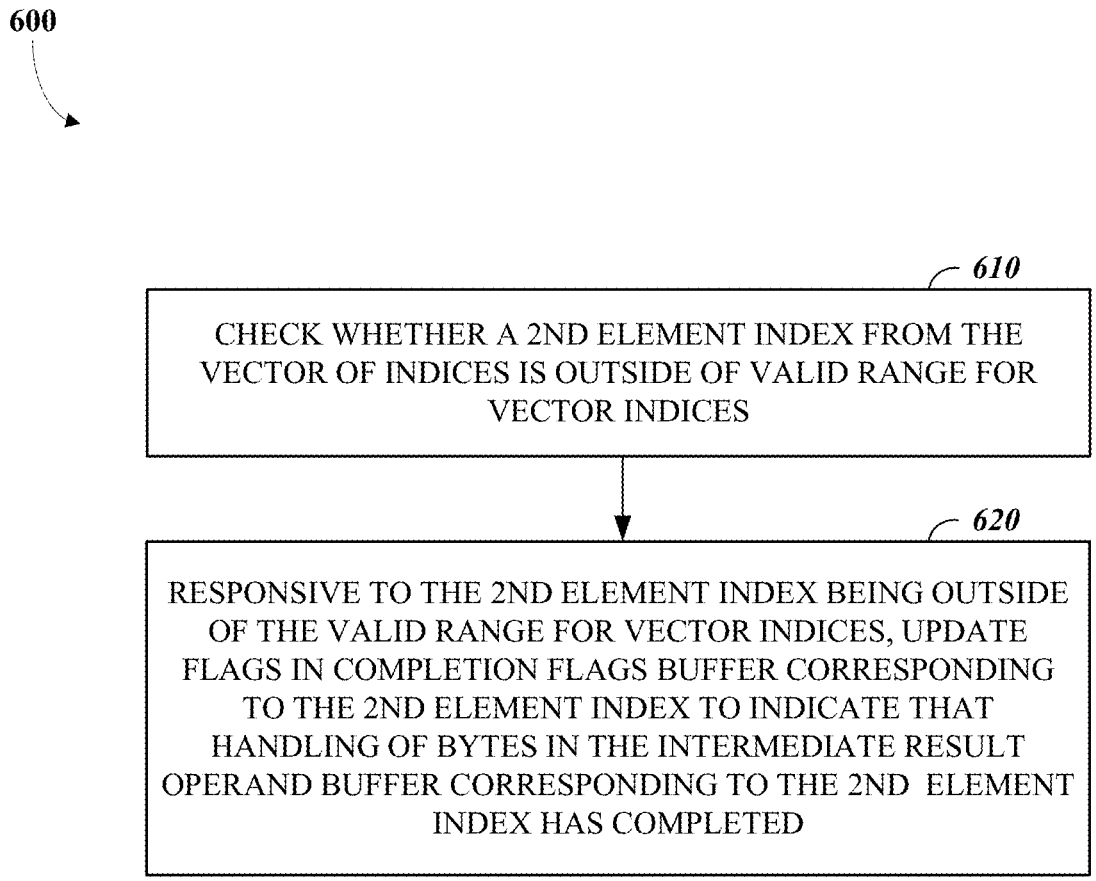
FIG. 6 is a flow chart of an example of a technique for tracking completion of indices that are outside a valid range.

FIG. 6 is a flow chart of an example of a technique 600 for tracking completion of indices that are outside a valid range. The technique 600 includes checking 610 whether a second element index from the vector of indices is outside of a valid range for vector indices; and, responsive to the second element index being outside of the valid range, updating 620 flags in the completion flags buffer (e.g., the completion flags buffer 160) corresponding to the second element index to indicate that handling of bytes in the intermediate result operand buffer (e.g., the intermediate result operand buffer 152) corresponding the second element index has completed. For example, the technique 600 may be implemented using the integrated circuit 110 of FIG. 1. For example, the technique 600 may be implemented using the system 1000 of FIG. 10.

Figure 7:
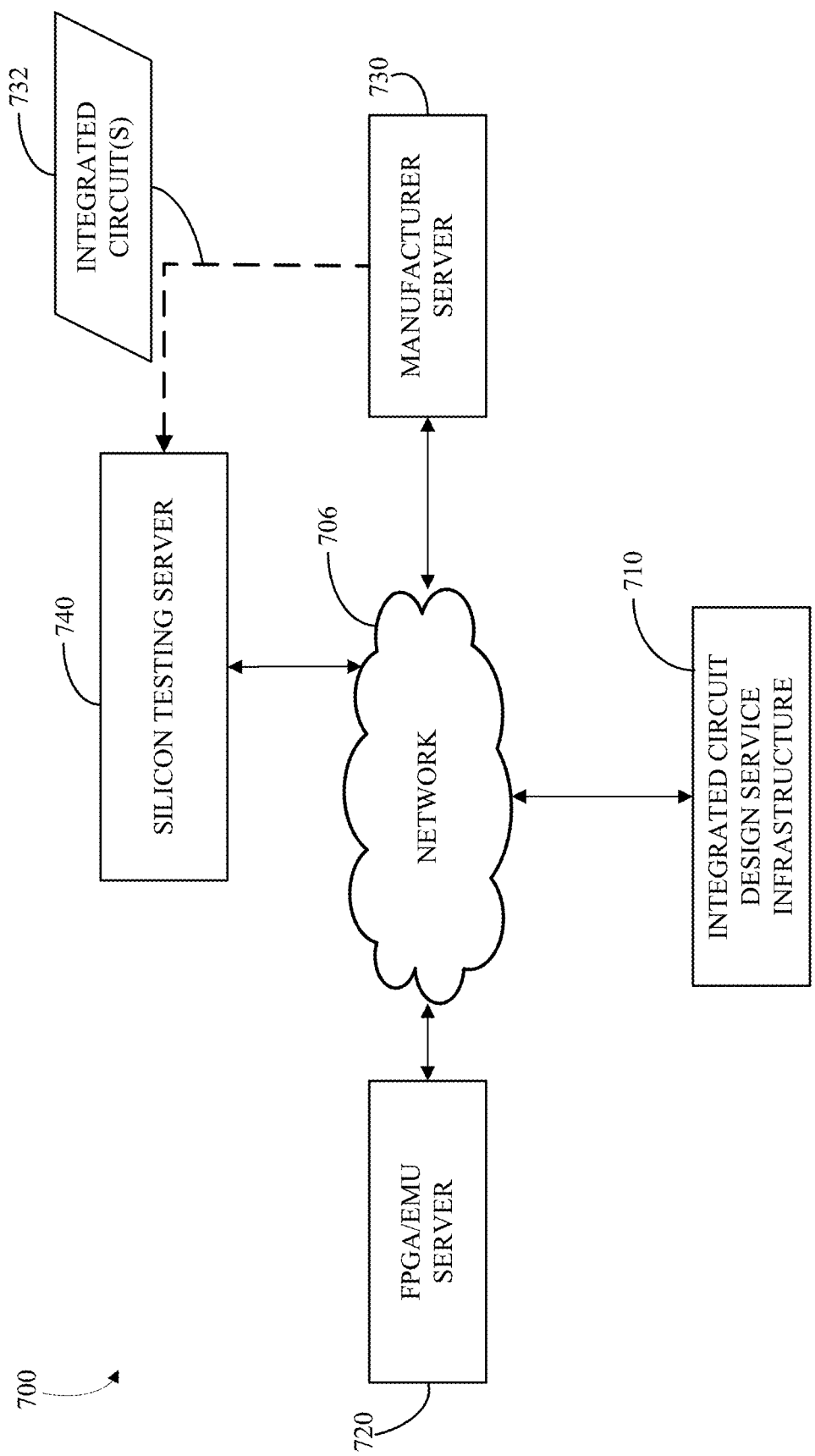
FIG. 7 is a block diagram of an example of a system for facilitating generation and manufacture of integrated circuits.

FIG. 7 is a block diagram of an example of a system 700 for generation and manufacture of integrated circuits. The system 700 includes a network 706, an integrated circuit design service infrastructure 710, a field programmable gate array (FPGA)/emulator server 720, and a manufacturer server 730. For example, a user may utilize a web client or a scripting API client to command the integrated circuit design service infrastructure 710 to automatically generate an integrated circuit design based on a set of design parameter values selected by the user for one or more template integrated circuit designs. In some implementations, the integrated circuit design service infrastructure 710 may be configured to generate an integrated circuit design that includes the circuitry shown and described in FIG. 1.

The integrated circuit design service infrastructure 710 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high-level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 710 may invoke (e.g., via network communications over the network 706) testing of the resulting design that is performed by the FPGA/emulation server 720 that is running one or more FPGAs or other types of hardware or software emulators. For example, the integrated circuit design service infrastructure 710 may invoke a test using a field programmable gate array, programmed based on a field programmable gate array emulation data structure, to obtain an emulation result. The field programmable gate array may be operating on the FPGA/emulation server 720, which may be a cloud server. Test results may be returned by the FPGA/emulation server 720 to the integrated circuit design service infrastructure 710 and relayed in a useful format to the user (e.g., via a web client or a scripting API client).

The integrated circuit design service infrastructure 710 may also facilitate the manufacture of integrated circuits using the integrated circuit design in a manufacturing facility associated with the manufacturer server 730. In some implementations, a physical design specification (e.g., a graphic data system (GDS) file, such as a GDS II file) based on a physical design data structure for the integrated circuit is transmitted to the manufacturer server 730 to invoke manufacturing of the integrated circuit (e.g., using manufacturing equipment of the associated manufacturer). For example, the manufacturer server 730 may host a foundry tape out website that is configured to receive physical design specifications (e.g., as a GDSII file or an OASIS file) to schedule or otherwise facilitate fabrication of integrated circuits. In some implementations, the integrated circuit design service infrastructure 710 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 710 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 730 may fabricate and/or test integrated circuits based on the integrated circuit design. For example, the associated manufacturer (e.g., a foundry) may perform optical proximity correction (OPC) and similar post-tapeout/pre-production processing, fabricate the integrated circuit(s) 732, update the integrated circuit design service infrastructure 710 (e.g., via communications with a controller or a web application server) periodically or asynchronously on the status of the manufacturing process, perform appropriate testing (e.g., wafer testing), and send to packaging house for packaging. A packaging house may receive the finished wafers or dice from the manufacturer and test materials and update the integrated circuit design service infrastructure 710 on the status of the packaging and delivery process periodically or asynchronously. In some implementations, status updates may be relayed to the user when the user checks in using the web interface and/or the controller might email the user that updates are available.

In some implementations, the resulting integrated circuits 732 (e.g., physical chips) are delivered (e.g., via mail) to a silicon testing service provider associated with a silicon testing server 740. In some implementations, the resulting integrated circuits 732 (e.g., physical chips) are installed in a system controlled by silicon testing server 740 (e.g., a cloud server) making them quickly accessible to be run and tested remotely using network communications to control the operation of the integrated circuits 732. For example, a login to the silicon testing server 740 controlling a manufactured integrated circuits 732 may be sent to the integrated circuit design service infrastructure 710 and relayed to a user (e.g., via a web client). For example, the integrated circuit design service infrastructure 710 may control testing of one or more integrated circuits 732, which may be structured based on an RTL data structure.

Figure 8:
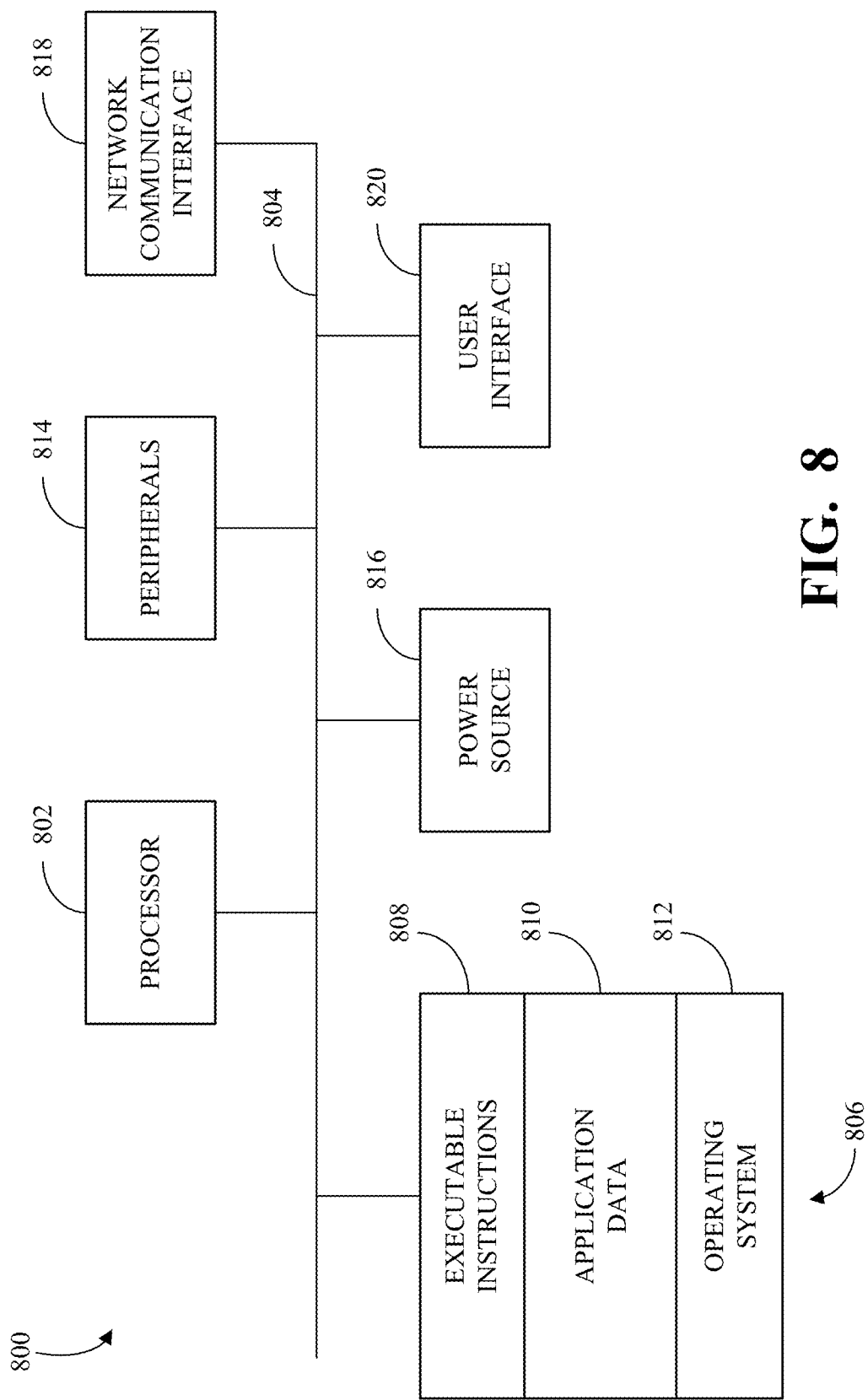
FIG. 8 is a block diagram of an example of a system for facilitating generation of integrated circuits.

FIG. 8 is a block diagram of an example of a system 800 for facilitating generation of integrated circuits, for facilitating generation of a circuit representation for an integrated circuit, and/or for programming or manufacturing an integrated circuit. The system 800 is an example of an internal configuration of a computing device. The system 800 may be used to implement the integrated circuit design service infrastructure 710, and/or to generate a file that generates a circuit representation of an integrated circuit design including the circuitry shown and described in FIG. 1. The system 800 can include components or units, such as a processor 802, a bus 804, a memory 806, peripherals 814, a power source 816, a network communication interface 818, a user interface 820, other suitable components, or a combination thereof.

The processor 802 can be a central processing unit (CPU), such as a microprocessor, and can include single or multiple processors having single or multiple processing cores. Alternatively, the processor 802 can include another type of device, or multiple devices, now existing or hereafter developed, capable of manipulating or processing information. For example, the processor 802 can include multiple processors interconnected in any manner, including hardwired or networked, including wirelessly networked. In some implementations, the operations of the processor 802 can be distributed across multiple physical devices or units that can be coupled directly or across a local area or other suitable type of network. In some implementations, the processor 802 can include a cache, or cache memory, for local storage of operating data or instructions.

The memory 806 can include volatile memory, non-volatile memory, or a combination thereof. For example, the memory 806 can include volatile memory, such as one or more DRAM modules such as double data rate (DDR) synchronous dynamic random access memory (SDRAM), and non-volatile memory, such as a disk drive, a solid state drive, flash memory, Phase-Change Memory (PCM), or any form of non-volatile memory capable of persistent electronic information storage, such as in the absence of an active power supply. The memory 806 can include another type of device, or multiple devices, now existing or hereafter developed, capable of storing data or instructions for processing by the processor 802. The processor 802 can access or manipulate data in the memory 806 via the bus 804. Although shown as a single block in FIG. 8, the memory 806 can be implemented as multiple units. For example, a system 800 can include volatile memory, such as RAM, and persistent memory, such as a hard drive or other storage.

The memory 806 can include executable instructions 808, data, such as application data 810, an operating system 812, or a combination thereof, for immediate access by the processor 802. The executable instructions 808 can include, for example, one or more application programs, which can be loaded or copied, in whole or in part, from non-volatile memory to volatile memory to be executed by the processor 802. The executable instructions 808 can be organized into programmable modules or algorithms, functional programs, codes, code segments, or combinations thereof to perform various functions described herein. For example, the executable instructions 808 can include instructions executable by the processor 802 to cause the system 800 to automatically, in response to a command, generate an integrated circuit design and associated test results based on a design parameters data structure. The application data 810 can include, for example, user files, database catalogs or dictionaries, configuration information or functional programs, such as a web browser, a web server, a database server, or a combination thereof. The operating system 812 can be, for example, Microsoft Windows®, macOS®, or Linux®; an operating system for a small device, such as a smartphone or tablet device; or an operating system for a large device, such as a mainframe computer. The memory 806 can comprise one or more devices and can utilize one or more types of storage, such as solid state or magnetic storage.

The peripherals 814 can be coupled to the processor 802 via the bus 804. The peripherals 814 can be sensors or detectors, or devices containing any number of sensors or detectors, which can monitor the system 800 itself or the environment around the system 800. For example, a system 800 can contain a temperature sensor for measuring temperatures of components of the system 800, such as the processor 802. Other sensors or detectors can be used with the system 800, as can be contemplated. In some implementations, the power source 816 can be a battery, and the system 800 can operate independently of an external power distribution system. Any of the components of the system

800, such as the peripherals 814 or the power source 816, can communicate with the processor 802 via the bus 804.

The network communication interface 818 can also be coupled to the processor 802 via the bus 804. In some implementations, the network communication interface 818 can comprise one or more transceivers. The network communication interface 818 can, for example, provide a connection or link to a network, such as the network 706 shown in FIG. 7, via a network interface, which can be a wired network interface, such as Ethernet, or a wireless network interface. For example, the system 800 can communicate with other devices via the network communication interface 818 and the network interface using one or more network protocols, such as Ethernet, transmission control protocol (TCP), Internet protocol (IP), power line communication (PLC), wireless fidelity (Wi-Fi), infrared, general packet radio service (GPRS), global system for mobile communications (GSM), code division multiple access (CDMA), or other suitable protocols.

A user interface 820 can include a display; a positional input device, such as a mouse, touchpad, touchscreen, or the like; a keyboard; or other suitable human or machine interface devices. The user interface 820 can be coupled to the processor 802 via the bus 804. Other interface devices that permit a user to program or otherwise use the system 800 can be provided in addition to or as an alternative to a display. In some implementations, the user interface 820 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 814. The operations of the processor 802 can be distributed across multiple clients or servers, which can be coupled directly or across a local area or other suitable type of network. The memory 806 can be distributed across multiple clients or servers, such as network-based memory or memory in multiple clients or servers performing the operations of clients or servers. Although depicted here as a single bus, the bus 804 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

FIG. 9 is an illustration of an example of a vector gather operation 900. A set of input data includes data stored in a group of N input data registers, including input data register 910, input data register 912, input data register 914, and input data register 916. A set of indices includes indices stored in a group of N index registers, including index register 920, index register 922, index register 924, and index register 926. Each index can point to any of the input data elements across the full group of N input data registers. A result vector 930 is built by dereferencing an index in the group of N index registers, including the index register 924, to access and copy an element of input data in the group of N input data registers to an element in a destination register corresponding to the index. In this example, the index register 924 stores four indices. The first index in the index register 924 points to an element of input data stored in the input data register 916, which is accessed and copied to a destination register corresponding to the index register 924. The second index in the index register 924 points to an element of input data stored in the input data register 912, which is also accessed and copied to the destination register corresponding to the index register 924. The third index in the index register 924 points to an element of input data stored in the input data register 914, which is also accessed and copied to the destination register corresponding to the index register 924. The fourth index in the index register 924 points to an element of input data stored in the input data register 910, which is also accessed and copied to the destination register corresponding to the index register 924. This process may be repeated for all of the registers of the group of N index registers to build a complete result vector stored in a group of N destination registers. In some implementations, it is possible for the number of input data registers and index registers to be different (i.e., not N both times). For example, this is a possible case in RISC-V Vector vrgather where there can be less index/result elements than input data elements.

FIG. 10 is a block diagram of an example of a system 1000 for executing instructions including stateful vector group permutation with storage reuse. The system 1000 includes an index expander 1010; a mask expander 1012; a build zeroing mask 1014; a resultRF register 1030; a valid mask register 1040; an extracting index register 1050; and a determining step indices mask 1070. For example, the system 1000 may be used to initialize an intermediate result operand buffer (e.g., the intermediate result operand buffer 152) and a completion flags buffer (e.g., the completion flags buffer 160) in an early phase of executing a vector group permutation instruction.

The system 1000 takes as inputs an input old destination data register 1002; an input vector index register 1004; a result mask register 1006 (e.g., set for new elements), and a standard element width (SEW) configuration parameter 1008 applicable to the vectors being processed. An element index vector is read from the input vector index register 1004 into the index expander 1010 to generate a corresponding byte index vector 1020. The index expander 1010 also takes the SEW configuration parameter 1008 as input to enable generation of byte indices. For example, the index expander 1010 may include the system 1100 of FIG. 11. In this example, the index expander 1010 also tests the element indices to check whether they have value in a valid range (e.g., non-negative and less than or equal to a maximum index value corresponding to the length of an input vector), and generates an out-of-bound mask that is used in turn to build a zeroing mask 1014.

The mask expander 1012 generates a byte mask based on a logical NOT of the result mask register 1006 and the SEW configuration parameter 1008, which is then logically ANDed with old data from the input old destination data register 1002 to preserve the bytes of masked off elements in the input old destination data register 1002.

The resultRF register 1030 is written with the logical OR of the preserved bytes of masked off elements in the input old destination data register 1002 with the logical AND of byte index vector 1020 with the build zeroing mask 1014.

The valid mask register 1040 is written based on a logical AND of the result mask register 1006 and the out-of-bounds mask generated by the index expander 1010.

The extracting index register 1050 is written with byte indices from the resultRF register 1030 using the mask stored in the valid mask register 1040. A minimum valid index from among the indices stored in the extracting index register 1050 is determined 1060 and used to determine a step indices mask 1070.

FIG. 11 is a block diagram of an example of a system 1100 for index expansion from element indices to byte indices. The system 1100 takes 64-bit slice of an input index register 1110 that stores element indices for a vector and generates a corresponding 64-bit slice of an output index register 1120 that stores bytes indices for data of the vector. The system 1100 also takes a standard element width (SEW) configuration parameter 1130 as input and uses it as a selector for a collection of multiplexors to configure the system 1100 to expand the input element indices to the proper number of corresponding byte indices. The system 1100 also includes left shift logic for multiplying element index values that correspond to elements larger than a single byte and added logic for incrementing the byte indices as needed to span the set of bytes for each element. The logic shown in FIG. 11 can expand element indices to corresponding sets of one or more byte indices for elements of sizes 1-byte (i.e., SEW=8 bits), 2-bytes (i.e., SEW=16 bits), 4-bytes (i.e., SEW=32 bits), or 8-bytes (i.e., SEW=64 bits). Note that this 64-bit slice could be expanded in parallel to handle larger vectors.

In a first aspect, the subject matter described in this specification can be embodied in an integrated circuit that includes a vector register file configured to store register values of an instruction set architecture; an input data operand buffer; an intermediate result operand buffer; a completion flags buffer; and a vector permutation circuitry configured to, responsive to a vector permutation instruction identifying a vector of indices stored in the vector register file, a vector of source data stored in the vector register file, and a destination vector to be stored in the vector register file: read the vector of source data into the input data operand buffer; expand an element index from the vector of indices to obtain byte indices for respective bytes of a corresponding element; store the byte indices in corresponding bytes of the intermediate result operand buffer; update bits in the completion flags buffer corresponding to the bytes of the intermediate result operand buffer storing the byte indices to indicate that the corresponding bytes store indices; identify bytes of the input data operand buffer storing an element of the vector of source data pointed to by the element index based on the byte indices stored in the intermediate result operand buffer; overwrite the byte indices in the intermediate result operand buffer with the identified bytes from the input data operand buffer; and, responsive to overwriting the byte indices in the intermediate result operand buffer with the identified bytes from the input data operand buffer, update the corresponding bits in the completion flags buffer to indicate that the corresponding bytes store data to be written to the destination vector.

In the first aspect, the vector permutation circuitry may be configured to: read a register of the vector of source data, a register of the vector of indices, and a register of the destination vector in parallel from the vector register file; and selectively store, based on a mask argument for the destination vector, bytes read from the destination vector and byte indices determined by expanding element indices of the vector of indices to a portion of the intermediate result operand buffer with a length equal to a register in the vector register file. In the first aspect, the vector permutation circuitry may be configured to: determine, based on a mask argument for the destination vector, an initial result array including bytes read from the destination vector corresponding to masked-off elements of the destination vector and zeroed bytes corresponding to elements expected to come from the source data vector; determine, based on the mask argument for the destination vector, an initial byte index array including expanded byte indexes corresponding to elements expected to come from the source data vector and zeroed bytes corresponding to masked-off elements; and store a bitwise OR of the initial result array and the initial byte index array in the intermediate result operand buffer. In the first aspect, the vector permutation circuitry may be configured to: update, based on the mask argument for the destination vector, bits in the completion flags buffer corresponding to the bytes of the intermediate result operand buffer corresponding to masked-off elements to indicate that the corresponding bytes store data to be written to the destination vector; and update, based on the mask argument for the destination vector, bits in the completion flags buffer corresponding to the bytes of the intermediate result operand buffer corresponding to elements expected to come from the source data vector to indicate that the corresponding bytes store indices. In the first aspect, the vector permutation circuitry may be configured to: check whether a second element index from the vector of indices is outside of a valid range for vector indices; and, responsive to the second element index being outside of the valid range, update flags in the completion flags buffer corresponding to the second element index to indicate that handling of bytes in the intermediate result operand buffer corresponding the second element index has completed. In the first aspect, the vector permutation circuitry may be configured to: responsive to the second element index being outside of the valid range, update an element in the intermediate result operand buffer corresponding to the second element index to take a default value associated with an index overflow condition. In the first aspect, the vector permutation circuitry may be configured to: responsive to the completion flags buffer indicating that a portion of the intermediate result operand buffer corresponding to a complete register stores data to be written to the destination vector, write data from the portion of the intermediate result operand buffer to a register in the vector register file. In the first aspect, the vector permutation circuitry may include a byte resolution data crossbar. In the first aspect, the vector of source data, the vector of indices, and the destination vector may each be stored in respective groups of multiple registers in the vector register file.

In a second aspect, the subject matter described in this specification can be embodied in methods for executing a vector permutation instruction identifying a vector of indices stored in a vector register file, a vector of source data stored in the vector register file, and a destination vector to be stored in the vector register file that include expanding an element index from the vector of indices to obtain byte indices for respective bytes of a corresponding element; storing the byte indices in corresponding bytes of an intermediate result operand buffer; updating bits in a completion flags buffer corresponding to the bytes of the intermediate result operand buffer storing the byte indices to indicate that the corresponding bytes store indices; identifying bytes of an element of the vector of source data pointed to by the element index based on the byte indices stored in the intermediate result operand buffer; overwriting the byte indices in the intermediate result operand buffer with the identified bytes; and, responsive to overwriting the byte indices in the intermediate result operand buffer with the identified bytes, updating the corresponding bits in the completion flags buffer to indicate that the corresponding bytes store data to be written to the destination vector.

In the second aspect, the methods may include reading a register of the vector of source data, a register of the vector of indices, and a register of the destination vector in parallel from a vector register file; and selectively storing, based on a mask argument for the destination vector, bytes read from the destination vector and byte indices determined by expanding element indices of the vector of indices to a portion of the intermediate result operand buffer with a length equal to a register in the vector register file. In the second aspect, the methods may include determining, based on a mask argument for the destination vector, an initial result array including bytes read from the destination vector corresponding to masked-off elements of the destination vector and zeroed bytes corresponding to elements expected to come from the source data vector; determining, based on the mask argument for the destination vector, an initial byte index array including expanded byte indices corresponding to elements expected to come from the source data vector and zeroed bytes corresponding to masked-off elements; and storing a bitwise OR of the initial result array and the initial byte index array in the intermediate result operand buffer. In the second aspect, the methods may include updating, based on the mask argument for the destination vector, bits in the completion flags buffer corresponding to the bytes of the intermediate result operand buffer corresponding to masked-off elements to indicate that the corresponding bytes store data to be written to the destination vector; and updating, based on the mask argument for the destination vector, bits in the completion flags buffer corresponding to the bytes of the intermediate result operand buffer corresponding to elements expected to come from the source data vector to indicate that the corresponding bytes store indices. In the second aspect, the methods may include checking whether a second element index from the vector of indices is outside of a valid range for vector indices; and, responsive to the second element index being outside of the valid range, updating flags in the completion flags buffer corresponding to the second element index to indicate that handling of bytes in the intermediate result operand buffer corresponding the second element index has completed. In the second aspect, the methods may include, responsive to the completion flags buffer indicating that a portion of the intermediate result operand buffer corresponding to a complete register stores data to be written to the destination vector, writing data from the portion of the intermediate result operand buffer to a register in the vector register file. In the second aspect, overwriting the byte indices in the intermediate result operand buffer with the identified bytes may be implemented using byte resolution crossbar.

In a third aspect, the subject matter described in this specification can be embodied in a non-transitory computer readable medium comprising a circuit representation that, when processed by a computer, is used to program or manufacture an integrated circuit that includes a vector register file configured to store register values of an instruction set architecture; an input data operand buffer; an intermediate result operand buffer; a completion flags buffer; and a vector permutation circuitry configured to, responsive to a vector permutation instruction identifying a vector of indices stored in the vector register file, a vector of source data stored in the vector register file, and a destination vector to be stored in the vector register file: read the vector of source data into the input data operand buffer; expand an element index from the vector of indices to obtain byte indices for respective bytes of a corresponding element; store the byte indices in corresponding bytes of the intermediate result operand buffer; update bits in the completion flags buffer corresponding to the bytes of the intermediate result operand buffer storing the byte indices to indicate that the corresponding bytes store indices; identify bytes of the input data operand buffer storing an element of the vector of source data pointed to by the element index based on the byte indices stored in the intermediate result operand buffer; overwrite the byte indices in the intermediate result operand buffer with the identified bytes from the input data operand buffer; and, responsive to overwriting the byte indices in the intermediate result operand buffer with the identified bytes from the input data operand buffer, update the corresponding bits in the completion flags buffer to indicate that the corresponding bytes store data to be written to the destination vector.

In the third aspect, the vector permutation circuitry may be configured to: read a register of the vector of source data, a register of the vector of indices, and a register of the destination vector in parallel from the vector register file;

and selectively store, based on a mask argument for the destination vector, bytes read from the destination vector and byte indices determined by expanding element indices of the vector of indices to a portion of the intermediate result operand buffer with a length equal to a register in the vector register file. In the third aspect, the vector permutation circuitry may be configured to: determine, based on a mask argument for the destination vector, an initial result array including bytes read from the destination vector corresponding to masked-off elements of the destination vector and zeroed bytes corresponding to elements expected to come from the source data vector; determine, based on the mask argument for the destination vector, an initial byte index array including expanded byte indexes corresponding to elements expected to come from the source data vector and zeroed bytes corresponding to masked-off elements; and store a bitwise OR of the initial result array and the initial byte index array in the intermediate result operand buffer. In the third aspect, the vector permutation circuitry may be configured to: update, based on the mask argument for the destination vector, bits in the completion flags buffer corresponding to the bytes of the intermediate result operand buffer corresponding to masked-off elements to indicate that the corresponding bytes store data to be written to the destination vector; and update, based on the mask argument for the destination vector, bits in the completion flags buffer corresponding to the bytes of the intermediate result operand buffer corresponding to elements expected to come from the source data vector to indicate that the corresponding bytes store indices. In the third aspect, the vector permutation circuitry may be configured to: check whether a second element index from the vector of indices is outside of a valid range for vector indices; and, responsive to the second element index being outside of the valid range, update flags in the completion flags buffer corresponding to the second element index to indicate that handling of bytes in the intermediate result operand buffer corresponding the second element index has completed. In the third aspect, the vector permutation circuitry may be configured to: responsive to the second element index being outside of the valid range, update an element in the intermediate result operand buffer corresponding to the second element index to take a default value associated with an index overflow condition. In the third aspect, the vector permutation circuitry may be configured to: responsive to the completion flags buffer indicating that a portion of the intermediate result operand buffer corresponding to a complete register stores data to be written to the destination vector, write data from the portion of the intermediate result operand buffer to a register in the vector register file. In the third aspect, the vector permutation circuitry may include a byte resolution data crossbar. In the third aspect, the vector of source data, the vector of indices, and the destination vector may each be stored in respective groups of multiple registers in the vector register file.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit comprising:
   a vector register file configured to store register values of an instruction set architecture;
   an input data operand buffer;
   an intermediate result operand buffer;
   a completion flags buffer; and
   a vector permutation circuitry configured to, responsive to a vector permutation instruction identifying a vector of indices stored in the vector register file, a vector of source data stored in the vector register file, and a destination vector to be stored in the vector register file:
   read the vector of source data into the input data operand buffer;
   expand an element index from the vector of indices to obtain byte indices for respective bytes of a corresponding element;
   store the byte indices in corresponding bytes of the intermediate result operand buffer;
   update bits in the completion flags buffer corresponding to the bytes of the intermediate result operand buffer storing the byte indices to indicate that the corresponding bytes store indices;
   identify bytes of the input data operand buffer storing an element of the vector of source data pointed to by the element index based on the byte indices stored in the intermediate result operand buffer;
   overwrite the byte indices in the intermediate result operand buffer with the identified bytes from the input data operand buffer; and
   responsive to overwriting the byte indices in the intermediate result operand buffer with the identified bytes from the input data operand buffer, update the corresponding bits in the completion flags buffer to indicate that the corresponding bytes store data to be written to the destination vector.

2. The integrated circuit of claim 1, in which the vector permutation circuitry is configured to:
   read a register of the vector of source data, a register of the vector of indices, and a register of the destination vector in parallel from the vector register file; and
   selectively store, based on a mask argument for the destination vector, bytes read from the destination vector and byte indices determined by expanding element indices of the vector of indices to a portion of the intermediate result operand buffer with a length equal to a register in the vector register file.

3. The integrated circuit of claim 1, in which the vector permutation circuitry is configured to:
   determine, based on a mask argument for the destination vector, an initial result array including bytes read from the destination vector corresponding to masked-off elements of the destination vector and zeroed bytes corresponding to elements expected to come from the vector of source data;
   determine, based on the mask argument for the destination vector, an initial byte index array including expanded byte indexes corresponding to elements expected to come from the vector of source data and zeroed bytes corresponding to masked-off elements; and
   store a bitwise OR of the initial result array and the initial byte index array in the intermediate result operand buffer.

4. The integrated circuit of claim 3, in which the vector permutation circuitry is configured to:
   update, based on the mask argument for the destination vector, bits in the completion flags buffer corresponding to the bytes of the intermediate result operand buffer corresponding to masked-off elements to indicate that the corresponding bytes store data to be written to the destination vector; and update, based on the mask argument for the destination vector, bits in the completion flags buffer corresponding to the bytes of the intermediate result operand buffer corresponding to elements expected to come from the vector of source data to indicate that the corresponding bytes store indices.

5. The integrated circuit of claim 1, in which the vector permutation circuitry is configured to:
check whether a second element index from the vector of indices is outside of a valid range for vector indices; and
responsive to the second element index being outside of the valid range, update flags in the completion flags buffer corresponding to the second element index to indicate that handling of bytes in the intermediate result operand buffer corresponding the second element index has completed.

6. The integrated circuit of claim 5, in which the vector permutation circuitry is configured to:
responsive to the second element index being outside of the valid range, update an element in the intermediate result operand buffer corresponding to the second element index to take a default value associated with an index overflow condition.

7. The integrated circuit of claim 1, in which the vector permutation circuitry is configured to:
responsive to the completion flags buffer indicating that a portion of the intermediate result operand buffer corresponding to a complete register stores data to be written to the destination vector, write data from the portion of the intermediate result operand buffer to a register in the vector register file.

8. The integrated circuit of claim 1, in which the vector permutation circuitry includes a byte resolution data crossbar.

9. The integrated circuit of claim 1, in which the vector of source data, the vector of indices, and the destination vector are each stored in respective groups of multiple registers in the vector register file.

10. A method for executing a vector permutation instruction identifying a vector of indices stored in a vector register file, a vector of source data stored in the vector register file, and a destination vector to be stored in the vector register file, comprising:
expanding an element index from the vector of indices to obtain byte indices for respective bytes of a corresponding element;
storing the byte indices in corresponding bytes of an intermediate result operand buffer;
updating bits in a completion flags buffer corresponding to the bytes of the intermediate result operand buffer storing the byte indices to indicate that the corresponding bytes store indices;
identifying bytes of an element of the vector of source data pointed to by the element index based on the byte indices stored in the intermediate result operand buffer;
overwriting the byte indices in the intermediate result operand buffer with the identified bytes; and
responsive to overwriting the byte indices in the intermediate result operand buffer with the identified bytes, updating the corresponding bits in the completion flags buffer to indicate that the corresponding bytes store data to be written to the destination vector.

11. The method of claim 10, comprising:
reading a register of the vector of source data, a register of the vector of indices, and a register of the destination vector in parallel from a vector register file; and
selectively storing, based on a mask argument for the destination vector, bytes read from the destination vector and byte indices determined by expanding element indices of the vector of indices to a portion of the intermediate result operand buffer with a length equal to a register in the vector register file.

12. The method of claim 10, comprising:
determining, based on a mask argument for the destination vector, an initial result array including bytes read from the destination vector corresponding to masked-off elements of the destination vector and zeroed bytes corresponding to elements expected to come from the vector of source data;
determining, based on the mask argument for the destination vector, an initial byte index array including expanded byte indices corresponding to elements expected to come from the vector of source data and zeroed bytes corresponding to masked-off elements; and
storing a bitwise OR of the initial result array and the initial byte index array in the intermediate result operand buffer.

13. The method of claim 12, comprising:
updating, based on the mask argument for the destination vector, bits in the completion flags buffer corresponding to the bytes of the intermediate result operand buffer corresponding to masked-off elements to indicate that the corresponding bytes store data to be written to the destination vector; and
updating, based on the mask argument for the destination vector, bits in the completion flags buffer corresponding to the bytes of the intermediate result operand buffer corresponding to elements expected to come from the vector of source data to indicate that the corresponding bytes store indices.

14. The method of claim 10, comprising:
checking whether a second element index from the vector of indices is outside of a valid range for vector indices; and
responsive to the second element index being outside of the valid range, updating flags in the completion flags buffer corresponding to the second element index to indicate that handling of bytes in the intermediate result operand buffer corresponding the second element index has completed.

15. The method of claim 10, comprising:
responsive to the completion flags buffer indicating that a portion of the intermediate result operand buffer corresponding to a complete register stores data to be written to the destination vector, writing data from the portion of the intermediate result operand buffer to a register in the vector register file.

16. The method of claim 10, in which overwriting the byte indices in the intermediate result operand buffer with the identified bytes is implemented using byte resolution crossbar.

17. A non-transitory computer readable medium comprising a circuit representation that, when processed by a computer, is used to program or manufacture an integrated circuit comprising:
a vector register file configured to store register values of an instruction set architecture;
an input data operand buffer;
an intermediate result operand buffer;
a completion flags buffer; and
a vector permutation circuitry configured to, responsive to a vector permutation instruction identifying a vector of indices stored in the vector register file, a vector of source data stored in the vector register file, and a destination vector to be stored in the vector register file:

read the vector of source data into the input data operand buffer;

expand an element index from the vector of indices to obtain byte indices for respective bytes of a corresponding element;

store the byte indices in corresponding bytes of the intermediate result operand buffer;

update bits in the completion flags buffer corresponding to the bytes of the intermediate result operand buffer storing the byte indices to indicate that the corresponding bytes store indices;

identify bytes of the input data operand buffer storing an element of the vector of source data pointed to by the element index based on the byte indices stored in the intermediate result operand buffer;

overwrite the byte indices in the intermediate result operand buffer with the identified bytes from the input data operand buffer; and responsive to overwriting the byte indices in the intermediate result operand buffer with the identified bytes from the input data operand buffer, update the corresponding bits in the completion flags buffer to indicate that the corresponding bytes store data to be written to the destination vector.

18. The non-transitory computer readable medium of claim 17, in which the vector permutation circuitry is configured to:

read a register of the vector of source data, a register of the vector of indices, and a register of the destination vector in parallel from the vector register file; and selectively store, based on a mask argument for the destination vector, bytes read from the destination vector and byte indices determined by expanding element indices of the vector of indices to a portion of the intermediate result operand buffer with a length equal to a register in the vector register file.

19. The non-transitory computer readable medium of claim 17, in which the vector permutation circuitry is configured to:

determine, based on a mask argument for the destination vector, an initial result array including bytes read from the destination vector corresponding to masked-off elements of the destination vector and zeroed bytes corresponding to elements expected to come from the vector of source data;

determine, based on the mask argument for the destination vector, an initial byte index array including expanded byte indexes corresponding to elements expected to come from the vector of source data and zeroed bytes corresponding to masked-off elements; and store a bitwise OR of the initial result array and the initial byte index array in the intermediate result operand buffer.

20. The non-transitory computer readable medium of claim 17, in which the vector permutation circuitry includes a byte resolution data crossbar.

\* \* \* \* \*